(12) United States Patent
Chase et al.

(10) Patent No.: US 10,030,712 B2
(45) Date of Patent: Jul. 24, 2018

(54) TORQUE DISC

(71) Applicant: CROMPTON TECHNOLOGY GROUP LTD, Banbury, Oxfordshire (GB)

(72) Inventors: Ian Thomas Chase, Banbury (GB); Paul Anthony Lewis, Warwick (GB); Michael James Dewhirst, Stratford Upon Avon (GB)

(73) Assignee: CROMPTON TECHNOLOGY GROUP LIMITED, Oxfordshire (GB)

( * ) Notice: Subject to any disclaimer, the term of this patent is extended or adjusted under 35 U.S.C. 154(b) by 0 days.

(21) Appl. No.: 14/355,111

(22) PCT Filed: Oct. 19, 2012

(86) PCT No.: PCT/GB2012/052596
§ 371 (c)(1),
(2) Date: Apr. 29, 2014

(87) PCT Pub. No.: WO2013/064807
PCT Pub. Date: May 10, 2013

(65) Prior Publication Data
US 2014/0309042 A1 Oct. 16, 2014

(30) Foreign Application Priority Data
Nov. 1, 2011 (GB) .................................. 1118821.6

(51) Int. Cl.
*F16D 3/78* (2006.01)

(52) U.S. Cl.
CPC .......... *F16D 3/78* (2013.01); *F16D 2200/006* (2013.01); *F16D 2200/0056* (2013.01)

(58) Field of Classification Search
CPC ............... F16D 3/78; F16D 2200/0056; F16D 2200/006
USPC ................................................ 464/69, 93–96
See application file for complete search history.

(56) References Cited

U.S. PATENT DOCUMENTS

| 1,551,517 A | * | 8/1925 | MacDonald | ..................... 464/93 |
| 1,691,116 A | * | 11/1928 | Jencick | ........................ 464/94 |
| 4,790,794 A | * | 12/1988 | Takeda | ...................... F16D 3/78 464/93 |
| 6,702,679 B2 | * | 3/2004 | Ishimoto | ................... F16D 3/78 464/69 |

FOREIGN PATENT DOCUMENTS

| DE | 910 986 | * | 5/1954 | |
| DK | 173909 B1 | | 2/2002 | |
| FR | 662000 A | | 8/1929 | |
| FR | 2619174 A1 | | 2/1989 | |
| GB | 164895 | * | 6/1921 | ...................... 464/94 |

(Continued)

OTHER PUBLICATIONS

Ruiz, Christina, "Role of Carbon and Glass Surfacing Veils." Hollingsworth & Vose Co., 2008.*

(Continued)

*Primary Examiner* — Gregory J Binda
(74) *Attorney, Agent, or Firm* — Cantor Colburn LLP

(57) ABSTRACT

A composite material torque disc which comprises a support layer, and a reinforcing fiber secured to the support layer, the support layer being embedded within a polymer matrix material.

14 Claims, 5 Drawing Sheets

(56) References Cited

FOREIGN PATENT DOCUMENTS

| | | | |
|---|---|---|---|
| GB | 2322428 | A | 8/1998 |
| GB | 2401923 | A | 11/2004 |
| JP | 6074248 | A | 3/1994 |

OTHER PUBLICATIONS

Notification of Transmittal of the International Search Report and the Written Opinion of the International Searching Authority, or the Declaration; PCT/GB2012/052596; dated Jan. 21, 2013.
Great Britain Search Report for Application No. GB1118821.6 dated Mar. 2, 2012 3 pages.

* cited by examiner

TORQUE DISC

CROSS REFERENCE TO RELATED APPLICATIONS

This is a US National Stage of Application No. PCT/GB2012/052596, filed on Oct. 19, 2012, which claims the benefit of GB Application No. 1118821.6 filed Nov. 1, 2011 the disclosures of which are incorporated herein by reference.

TECHNICAL FIELD

This invention relates to a torque disc for use in the transmission of torque between a pair of generally coaxial components. In particular, the invention relates to a torque disc of a composite material.

BACKGROUND

The use of torque discs in the transmission of torque between, for example, a pair of generally coaxially arranged rotating shafts or the like is well known, the torque disc being able to flex slightly to accommodate small amounts of misalignment between the shafts. A range of materials are used in such torque discs, for example rubber-like materials have been used in this type of application. It is becoming increasingly common to use composite materials in such torque discs. The use of composite materials is advantageous in that the materials are of high strength whilst also being relatively low in weight.

GB2401923 describes a composite material torque disc which is composed of a plurality of layers of a woven fibrous material, for example of carbon fibre form, embedded within a polymer matrix material. The layers of woven fibrous material are angularly displaced from one another so as to enhance the strength and ability of the torque disc to withstand loadings in a range of different directions.

Typically, the torque disc is secured to the rotating shafts or the like with which it is used by a series of fasteners, for example in the form of screw threaded bolts. The bolts pass through respective openings formed in the torque disc. It is important to ensure that the parts of the torque disc through which or in which the openings are formed are of sufficient strength to be able to withstand the loadings applied thereto, in use. The provision of openings in composite materials weakens the material and so may limit their suitability for use in torque disc applications.

It is an object of the invention, therefore, to provide a composite material torque disc of enhanced strength, particularly in the regions thereof to be secured to other components.

SUMMARY

According to the present invention there is provided a composite material torque disc comprising a support layer, and a reinforcing fibre secured to the support layer, the support layer being embedded within a polymer matrix material.

The torque disc conveniently further comprises a core, for example in the form of one or more core layers of woven fibrous form. Preferably, the core layers are of woven carbon fibre form.

The reinforcing fibre conveniently takes the form of a carbon fibre tow comprising a plurality of carbon fibres. The reinforcing fibre is conveniently secured to the support layer by being stitched thereto. For example, a polyester or nylon thread may be used to stitch the reinforcing fibre to the support layer. The support layer conveniently takes the form of a veil of glass fibre, carbon fibre, aramid fibre or another suitable fibrous material.

The torque disc is conveniently formed with a plurality of fixing points, and the reinforcing fibre is conveniently arranged on the support layer in a pattern such that the reinforcing fibre strengthens each fixing point. Conveniently, the reinforcing fibre further serves to assist in transmission of loadings between adjacent fixing points. Preferably, the reinforcing fibre repeatedly encircles adjacent pairs of fixing points. The reinforcing fibre may be arranged to encircle each adjacent pair of fixing points at least ten times. Openings may be formed at each fixing point to allow the attachment of fasteners to the torque disc at the fixing points.

Where the reinforcing fibre passes around each fixing point, it conveniently results in the formation of a hub of increased thickness in the torque disc. Each hub is conveniently of generally oval shape with the major axis thereof extending generally radially of the torque disc.

Preferably, the torque disc further comprises a generally planar region interconnecting an adjacent pair of fixing points, wherein a slot is provided in the generally planar region, dividing the generally planar region into a pair of limbs.

Preferably, the torque disc includes at least two support layers, each of which has a reinforcing fibre secured thereto.

BRIEF DESCRIPTION OF THE DRAWINGS.

The invention will further be described, by way of example, with reference to the accompanying drawings, in which.

DETAILED DESCRIPTION

Figure 4A:
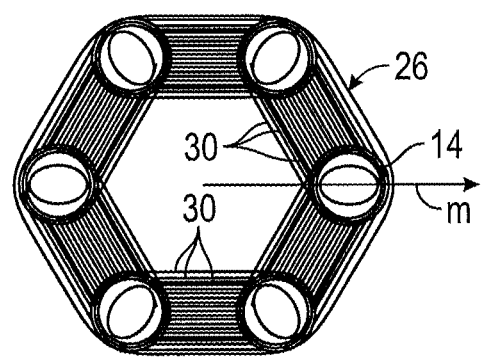
FIGS. 4a and 4b are diagrams illustrating the pattern in which the reinforcing fibre is secured to the support layer.
Figure 4B:
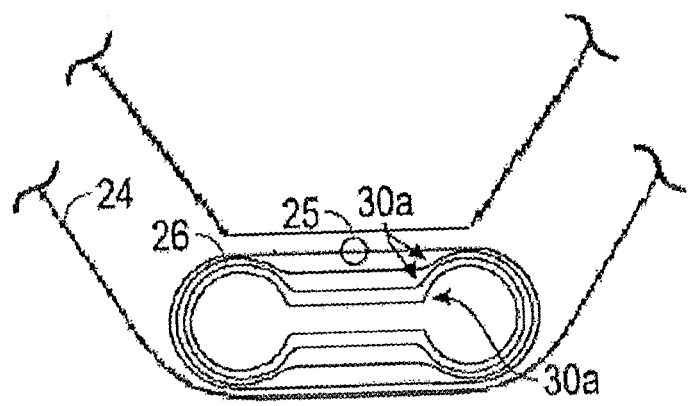
Figure 5:
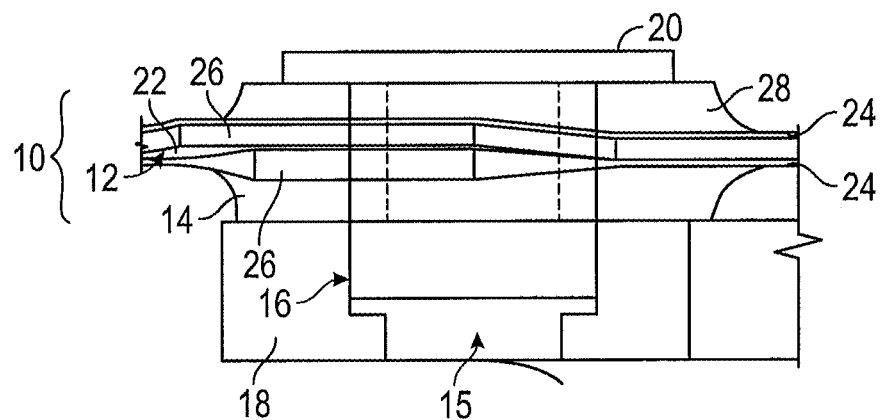
FIG. 5 is a diagrammatic sectional view of part of the torque disc.

Referring to FIGS. 1 to 5 and 7 of the accompanying drawings, a torque disk 10 of a composite material is illustrated. The torque disc 10 includes a generally planar part 12 of generally hexagonal shape and substantially uniform thickness, and upon which a series of hubs 14 of increased thickness are formed. Openings 16 extend through the torque disc 10 at each hub 14, the openings 16 defining fixing points whereby the torque disc 10 can be secured to, for example, a flange 18 of an adjacent rotating shaft or component using fastener devices or components (not shown), for example in the form of screw threaded bolts or the like, extending through the openings 16 and corresponding openings 15 formed in the flange 18. As shown in FIG. 5, a sleeve 20 is preferably fitted within each opening 16.

The sleeve 20 is conveniently an interference fit, slightly compressing the material of the torque disc adjacent the respective opening 16. The sleeve 20 conveniently projects from both axial ends of the associated opening 16, and an end part of the sleeve 20 is conveniently accommodated within the corresponding opening formed in the flange 18.

Figure 1:
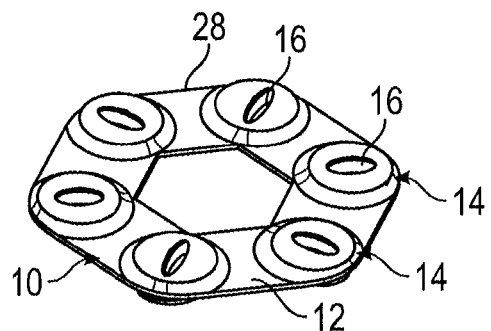
FIG. 1 is a perspective view illustrating a torque disc in accordance with one embodiment of the invention.
Figure 2:
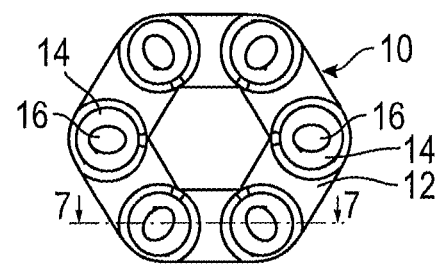
FIG. 2 is a plan view of the torque disc of FIG. 1.
Figure 3:
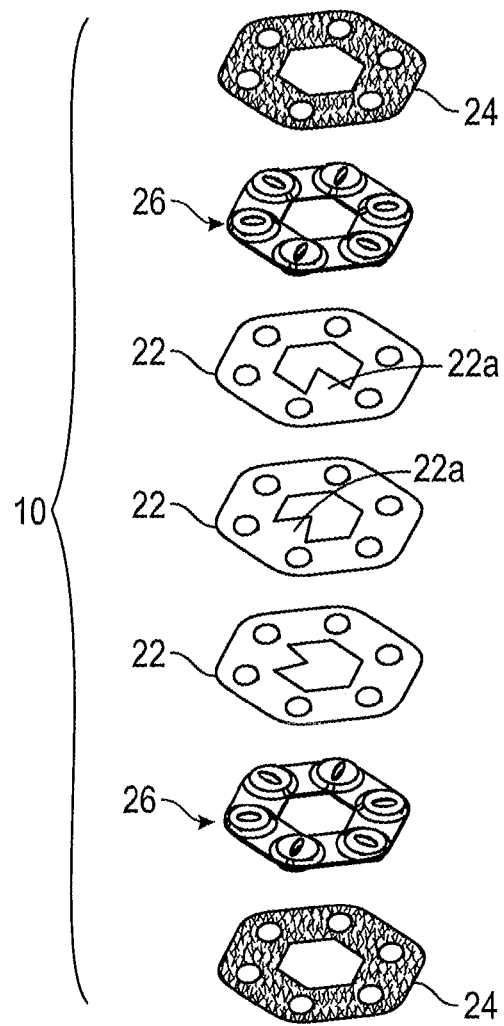
FIG. 3 is a diagrammatic exploded view of the torque disc.

As shown in FIG. 3, the torque disc 10 is of multi-layered form, being made up of a plurality of core layers 22 of woven, fibrous form. In this embodiment, the core layers 22 are sandwiched between a pair of support layers 24. Each core layer 22 is conveniently of woven carbon fibre form, and the individual core layers 22 are conveniently orientated such that the weave of each layer is angularly displaced relative to that of an adjacent one of the layers 22. An indicator part 22a is conveniently provided on each layer 22 to assist in the manufacturing process, providing a visible indication of the orientation of each core layer 22, the parts 22a being removed in the finished product.

Each support layer 24 takes the form of a veil of glass fibre, carbon fibre or aramid fibre form. It will be appreciated that other fibrous materials may be used to form the veil for the support layer 24 depending upon the required operating characteristics and conditions of use.

Figure 7:
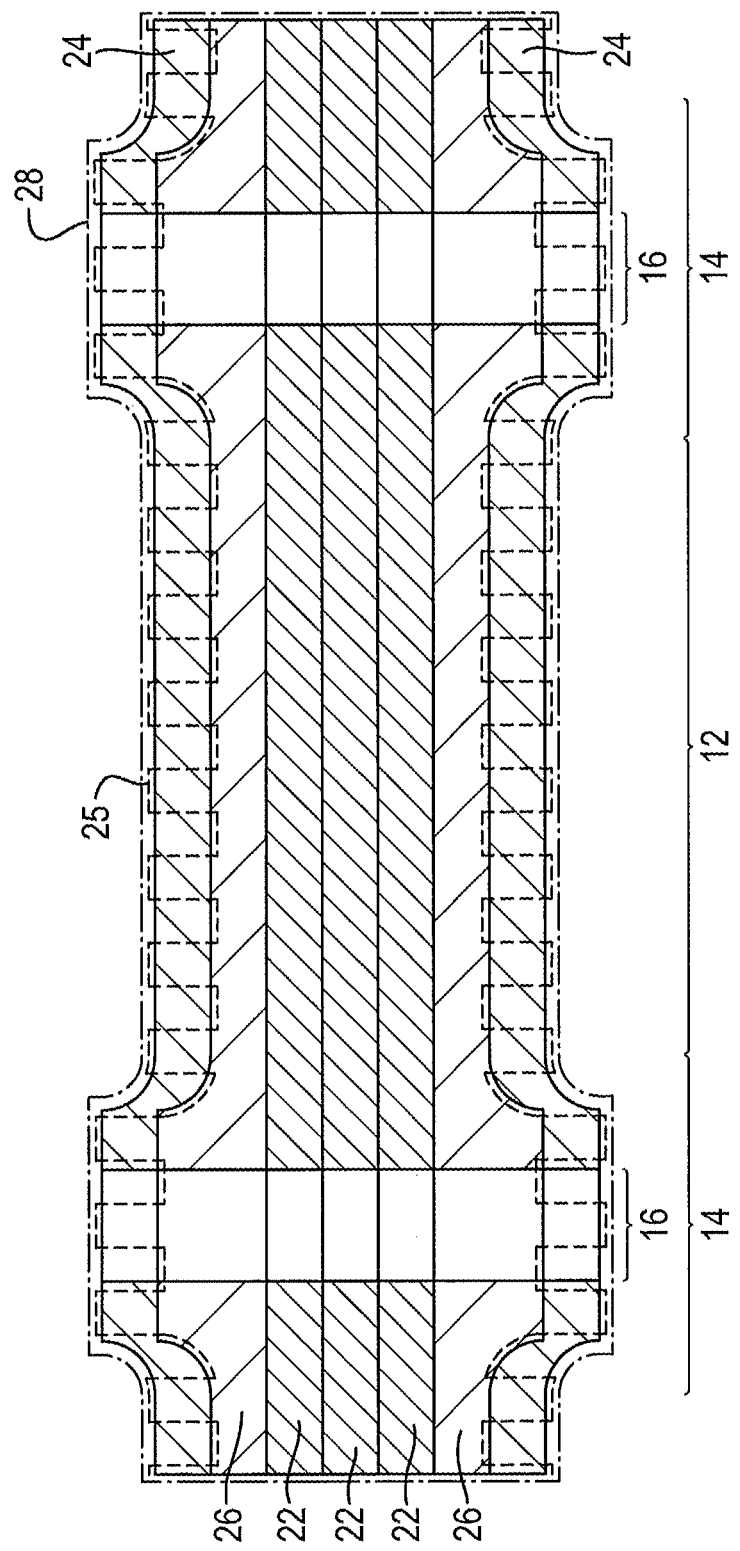
FIG. 7 is a sectional side view along the line 7-7 in FIG. 2.
Figure 8:
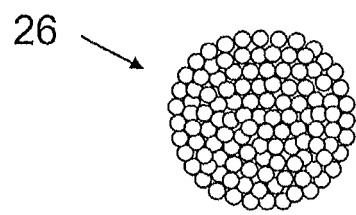
FIG. 8 is a cross section of or the reinforcing fibre of FIGS. 3, 4A, 4B, 5 and 7.

To the surface of each support layer 24 facing towards the core layers 22 is secured a reinforcing fibre 26. In FIG. 3, the reinforcing fibres 26 are illustrated as a separate layer. It will be appreciated, however, that in practice the reinforcing fibre 26 is secured to the associated support layer 24 prior to assembly or laying up of the layers forming the torque disc 10. The reinforcing fibre 26 takes the form of a carbon fibre tow, made up, in the preferred embodiment, of approximately 6000 individual filaments. An example of filaments are shown in FIG. 8. The reinforcing fibre 26 is secured to support layer 24 by being stitched thereto using, for example, a polyester thread 25 (FIG. 7).

The assembly of the core layers 22 and support layers 24, each support layer having a reinforcing fibre 26 secured thereto, is compressed and embedded within, and impregnated by, a polymer matrix material 28 in a compression or pressure molding process.

FIGS. 4a and 4b illustrate the pattern in which the reinforcing fibre 26 is secured to the support layer 24. As shown, the fibre 26 repeatedly encircles each adjacent pair of fixing points and so forms a series of windings 30. In the arrangement illustrated, ten windings 30 encircle each adjacent pair of fixing points. It will be appreciated, however, that more or fewer windings 30 could be provided, if desired. Between the locations of the fixing points, the windings 30 are generally uniformly spread apart from one another. Such spreading of the windings 30 avoids unnecessarily overlying one winding over another and so avoid unnecessarily increasing the thickness of the planar part 12 of the torque disc 10, This allows the planar part 12 to be thinner than in similar torque discs produced by the traditional method whilst having the same (or greater) torque transmitting capability. Further, the reduced thickness of the planer part 12 allows the disc to have greater flexibility in this region resulting in lower stresses, in use, for a given misalignment of shafts and an ability to more readily accommodate greater shaft misalignments. In order to maximise the number of windings 30 without overlying the windings 30 or increasing the overall dimensions of the torque disc 10, the inner ones of the windings 30 are shaped so as to almost completely encircle one of the fixing points before extending directly towards and almost completely encircling the adjacent one of the fixing points, as shown diagrammatically in FIG. 4b. Such a pattern does result in the formation of parts 30a where the radius of curvature of the reinforcing fibre 26 is relatively small, but it is still sufficiently large as to avoid an unacceptably high risk of snapping or failure of the reinforcing fibre 26.

As the reinforcing fibre 26 passes around each fixing point the spacing of the windings 30 is reduced with the result that some of the windings 30 may lie on top of the others of the windings 30 in this region. This stacking of the windings 30 upon one another serves to strengthen the hubs 14. Also, it results in the hubs 14 taking on a generally oval shape with the major axes m thereof extending generally radially of the torque disc 10. The oval shaping of the hubs 14 maximizes the separation of the hubs 14 and so maximizes the flexibility of the torque disc.

A single reinforcing fibre 26 is secured to each supporting layer 24, the reinforcing fibre 26, after being wound around one pair of adjacent fixing points by the required number of windings, then being wound around the next adjacent pair of fixing points, this process being repeated until the pattern shown in FIG. 4a is achieved.

Whilst one specific reinforcing fibre pattern is described hereinbefore and shown in the drawings, it will be appreciated that a range of other patterns could be used without departing from the scope of the invention. Furthermore, whilst the described pattern is achieved using a single length of reinforcing fibre 26, several such fibres could be secured to the support layer 24, if desired.

In use, the torque disc 10 is secured, for example by way of threaded bolts or other fasteners, between a pair of rotatable shafts of the like. Alternate ones of the openings 16 are used to secure the torque disc 10 to one of the shafts, and the remaining alternate ones of the openings 16 are used to secure the torque disc 10 to the other of the shafts. Rotation of, and torque loadings applied to, one of the shafts are transmitted by the torque disc 10 to the other of the shafts, flexing of the planar part 12 of the torque disc 10 accommodating slight misalignments between the shafts.

The torque disc of this invention is advantageous in that it is of relatively low weight, but of high strength, the presence of the reinforcing fibres serving to bear torsional loadings, transmitting the loadings between the adjacent fixing points and hence between the shafts, without requiring the torque disc to be of great thickness, and so maintaining sufficient flexibility to be able to accommodate the required level of misalignment between the shafts. The manner in which the reinforcing fibre 26 passes around the fixing points serves to enhance the strength thereof. As the pattern of the reinforcing fibre 26 is repeated for each adjacent pair of fixing points, the adjacent groups of windings can interlock with one another, further enhancing the performance of the device.

The torque disc produced in the manner of the invention also exhibits a greater fatigue resistance than similar torque discs manufactured in the traditional manner in that the support layer with stitched carbon fibre reinforcement is much less susceptible in use to fatigue fractures within the individual filaments and any such fractures which do occur have far less impact on the overall continued torque transmitting capability of the disc.

Figure 6:
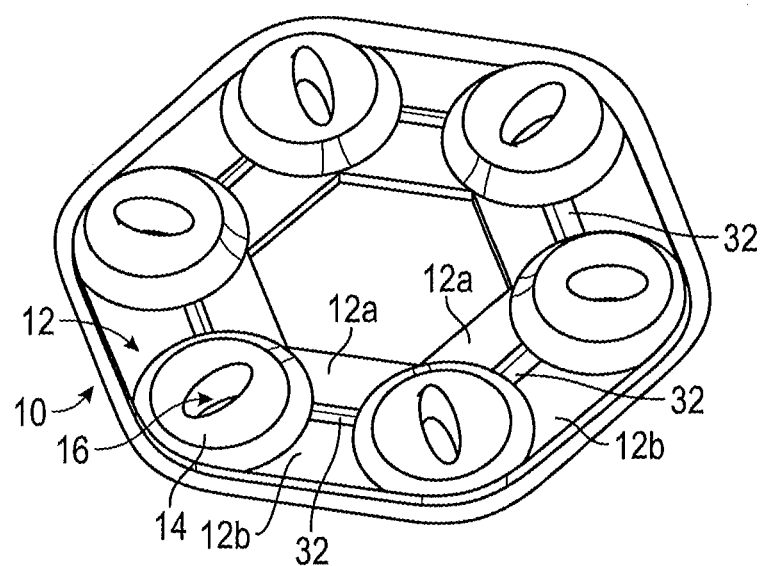
FIG. 6 illustrates a modification to embodiment of FIGS. 1 to 5.

It has been found that, in use, angular misalignment, applied torque and axial displacement result in the generation of complex strains in the generally planar region 12. These strains are far from planar and can result in cracking of the torque disc 10. Such cracking typically occurs along a line interconnecting each adjacent pair of openings 16. FIG. 6 illustrates a modification to the embodiment described hereinbefore with reference to FIGS. 1 to 5 in which such cracking is less likely to occur.

In the embodiment of FIG. 6, slots 32 are formed in the torque disc 10, each slot 32, in this embodiment, extending along a line intersecting the axes of adjacent ones of the openings 16, the slots 32 stopping short of the respective hubs 14. Between each adjacent pair of openings 16, the presence of the slot 32 results in the generally planar part 12 defining a pair of limbs 12a, 12b extending generally parallel to one another. The limbs 12a, 12b are able to flex relative to one another by a small amount. As a consequence, when the torque disc 10 is rotated, in use, the limited relative movement which can occur between the adjacent limbs 12a, 12b avoids or reduces the generation of the aforementioned strains and so the risk of cracking of the generally planar part 12 is reduced.

The slots 32 may be formed in the torque disc 10 after impregnation and curing of the resin material 28, for example by appropriate machining of the torque disc 10. However, other manufacturing methods may be used. By way of example, the slots 32 could be moulded into the torque disc 10 as part of the aforementioned compression or pressure moulding process.

Whilst specific embodiments of the invention are described hereinbefore, it will be appreciated that a wide range of modifications and alterations may be made thereto without departing from the scope of the invention as defined by the appended claims.

The invention claimed is:

1. A multi-layered composite material torque disc comprising;
    a support layer;
    a reinforcing fibre layer on support layer and comprising a reinforcing fiber secured to the support layer, the support layer and reinforcing fibre layer being embedded within a polymer matrix material; and
    a plurality of fixing points, the reinforcing fibre being arranged on the support layer in a pattern such that the reinforcing fibre strengthens each fixing point, wherein the reinforcing fibre repeatedly encircles adjacent pairs of fixing points.

2. A torque disc according to claim 1 further comprising a core comprising one or more core layers of woven fibrous form.

3. A torque disc according to claim 2, wherein the core layers are of woven carbon fibre form.

4. A torque disc according to claim 1, wherein the reinforcing fibre takes the form of a carbon fibre tow comprising a plurality of carbon fibres.

5. A torque disc according to claim 1, wherein the reinforcing fibre is secured to the support layer by being stitched thereto.

6. A torque disc according to claim 1, wherein the support layer takes the form of a glass fibre, carbon fibre or aramid fibre material veil.

7. A torque disc according to claim 1, wherein the reinforcing fibre further serves to assistant in transmission of loadings between adjacent fixing points.

8. A torque disc according to claim 1, wherein the reinforcing fibre is arranged to encircle each adjacent pair of fixing points at least ten times.

9. A torque disc according to claim 1, wherein openings are formed at each fixing point to allow the attachment of fasteners to the torque disc at the fixing points.

10. A torque disc according to claim 9, further comprising insert sleeves interference fitted into each opening.

11. A torque disc according to claim 1, wherein the reinforcing fibre passes around each fixing point, and results in the formation of a hub of increased thickness in the torque disc.

12. A torque disc according to claim 11, wherein each hub is of generally oval shape with the major axis thereof extending generally radially of the torque disc.

13. A torque disc according to claim 1, and including at least two support layers, each of which has a reinforcing fibre secured thereto.

14. A composite material torque disc comprising;
    a support layer;
    a reinforcing fibre secured to the support layer, the support layer being embedded within a polymer matrix material;
    a plurality of fixing points, the reinforcing fibre being arranged on the support layer in a pattern such that the reinforcing fibre strengthens each fixing point, wherein the reinforcing fibre repeatedly encircles adjacent pairs of fixing points; and
    a generally planar region interconnecting an adjacent pair of fixing points, wherein a slot is provided in the generally planar region, dividing the generally planar region into a pair of limbs.

* * * * *